United States Patent
Ben-Avi et al.

(10) Patent No.: US 12,406,247 B2
(45) Date of Patent: Sep. 2, 2025

(54) SYSTEM, DEVICE AND METHOD FOR DIGITAL PAYMENT

(71) Applicant: NAYAX LTD., Herzliya (IL)

(72) Inventors: David Ben-Avi, Herzliya (IL); Guy Rosenhoiz, Herzliya (IL)

(73) Assignee: NAYAX LTD., Herzliya (IL)

( * ) Notice: Subject to any disclaimer, the term of this patent is extended or adjusted under 35 U.S.C. 154(b) by 0 days.

(21) Appl. No.: 18/719,659

(22) PCT Filed: Jan. 25, 2023

(86) PCT No.: PCT/IL2023/050085
§ 371 (c)(1),
(2) Date: Jun. 13, 2024

(87) PCT Pub. No.: WO2023/161919
PCT Pub. Date: Aug. 31, 2023

(65) Prior Publication Data
US 2024/0428224 A1    Dec. 26, 2024

(30) Foreign Application Priority Data
Feb. 23, 2022 (IL) .......................... 290829

(51) Int. Cl.
*G06Q 20/32* (2012.01)
*G06Q 20/36* (2012.01)

(52) U.S. Cl.
CPC ......... *G06Q 20/3278* (2013.01); *G06Q 20/36* (2013.01)

(58) Field of Classification Search
None
See application file for complete search history.

(56) References Cited

U.S. PATENT DOCUMENTS

| | | |
|---|---|---|
| 2012/0330764 A1 | 12/2012 | Nahidipour |
| 2016/0162882 A1* | 6/2016 | McClung, III ....... G06Q 20/352 705/41 |

FOREIGN PATENT DOCUMENTS

| | | |
|---|---|---|
| JP | 2019215687 A | 12/2019 |
| KR | 20120128941 A | 11/2012 |
| KR | 101836191 B1 | 3/2018 |

OTHER PUBLICATIONS

PCT International Search Report for International Application No. PCT/IL2023/050085, mailed Apr. 30, 2023, 3pp.
PCT Written Opinion for International Application No. PCT/IL2023/050085, mailed Apr. 30, 2023, 3pp.
Israel Patent Office, Search Report—ILPO for Israeli Patent Application No. 290829, dated May 23, 2022, 2pp.

* cited by examiner

*Primary Examiner* — Matthew S Gart
*Assistant Examiner* — Liz P Nguyen
(74) *Attorney, Agent, or Firm* — The Roy Gross Law Firm, LLC; Roy D. Gross

(57) ABSTRACT

A system, apparatus, and method for performing payments using a web browser. The payment is made by activating a uniform resource locater (URL), which is linked to a website at a server, wherein the website comprises an embedded payment program that is loaded with a predetermined amount of payment and installs the embedded payment program in the mobile device. The payment program is configured to transfer the payment data through a near-field communication (NFC) radio to a payment terminal. The payment program is deleted after performing the payment.

23 Claims, 5 Drawing Sheets

SYSTEM, DEVICE AND METHOD FOR DIGITAL PAYMENT

CROSS REFERENCE TO RELATED APPLICATIONS

This application is a National Phase of PCT Patent Application No. PCT/IL2023/050085 having International filing date of Jan. 25, 2023, which claims the benefit of priority of Israeli Patent Application No. 290829, filed Feb. 23, 2022, the contents of which are all incorporated herein by reference in their entirety.

TECHNICAL FIELD

Some embodiments described herein are generally relayed to a digital payment method and system, specifically for transacting currency over a digital network.

BACKGROUND

A digital payment system may use a digital wallet to perform payments over the Internet and/or metered networks and/or stores. The digital wallet may have and/or include credit card information and/or the bank account information and/or any other payment method and/or balance of a buyer. The digital wallet has access to such buyers' payments accounts and/or accounts to purchase merchandise on the Internet or physical stores. Thus, storing the credit card information in the digital wallet may be open to a range of security issues.

There is a need to provide a solution to purchase goods and services using a computing device without using a permanent digital wallet application.

SUMMARY

Embodiments of this disclosure may be related to a system, a method, and a server for managing payments configured to use a web browser to pay for goods and services are described hereinbelow by the ways of example only.

One embodiment may include a system for performing payments by using a web browser for paying for goods and services, comprising a mobile device, wherein the mobile device is configured to: receive from a server a text message comprising a uniform resource locater (URL), which is linked to a website at the server; activate the URL, wherein the activation of the URL opens a web page comprising an embedded payment program which is loaded with a predetermined amount of payment and installs the embedded payment program in the mobile device, transfer the payment card data and the predetermined amount of payment through a near field communication (NFC) radio of the mobile device to a payment terminal by the embedded payment program, and delete the embedded payment program and the payment card data after performing the payment by closing the web page at the end of the transaction.

For example, the payment terminal may include EuroPay, MasterCard, Visa (EMV) terminal.

For example, the payment card data may comply with the EMV standard.

For example, the embedded payment program may include a digital wallet program.

For example, the web page may include a graphical representation of the embedded payment program and one or more information elements.

For example, the embedded payment program is configured to control the NFC radio.

For example, the payment card data comprises at least one of a bank account details, an account holder date of expiration of the payment card data, an available sum of money for payment.

For example, the system may comprises a server for managing payments, wherein the server is configured to: generate the URL, which is linked to the website at the server, wherein the website comprises an embedded payment program that is configured to perform payment based on payment card data; and send the URL to the mobile device in a text message.

For example, the payment terminal is configured to send a purchase status information to the server.

For example, the predetermined amount of payment is selected from a national currency, a cryptographic currency, loyalty club points and a money-worth coupon.

Another embodiment may include a method for performing payments by using a web browser for paying for goods and services operating in a mobile device, comprising: receiving from a server a text message comprising a uniform resource locater (URL), which is linked to a website at the server; activating the URL, wherein the activation of the URL may open a web page that may include an embedded payment program which is loaded with a predetermined amount of payment and installs the embedded payment program in the mobile device; performing a payment by the embedded payment program, which is configured to transfer the payment card data through a near field communication (NFC) radio of the mobile device to a payment terminal, and after performing the payment, delete the embedded payment program by closing the web page at the end of the transaction.

Another other embodiment may include a server for performing payments, wherein the server is configured to: generate a text message comprising a uniform resource locater (URL), which is linked to a website at the server, wherein the website comprises an embedded payment program loaded with a predetermined amount of payment and payment card data; send the URL to a mobile device to be activated; and perform payment by the embedded payment program, which is configured to transfer payment card data through a near field communication (NFC) radio to a payment terminal.

For example, the embedded program and the payment card data are deleted after performing the payment by closing the web page at the end of the transaction.

For example, the embedded payment program comprises a digital wallet program loaded with the predetermined amount of payment.

DETAILED DESCRIPTION

Figure 1:
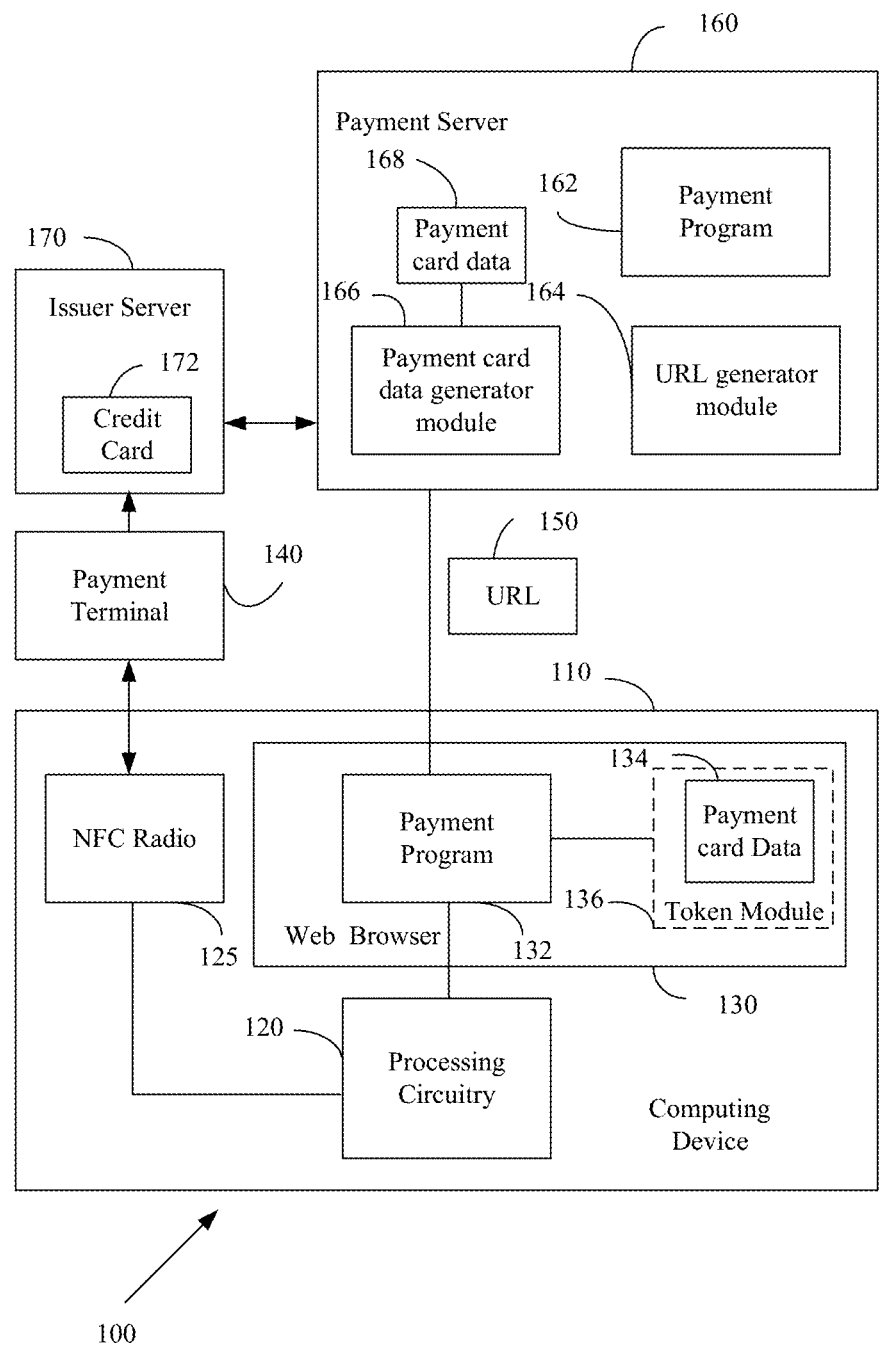
FIG. 1 illustrates a block diagram of a system for purchasing goods and services using a web browser, according to some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units, and/or circuits have not been described in detail so as not to obscure the discussion.

Discussions made herein utilizing terms such as, for example, "processing," "computing," "calculating," "determining," "establishing," "analyzing," "checking," or the like, may refer to operation(s) and/or process(es) of a computer, a computing platform, a computing system, or other electronic computing devices, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality," as used herein, include, for example, "multiple" or "two or more." For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified, the use of the ordinal adjectives "first," "second," "third," etc., to describe a common object merely indicate that different instances of like objects are being referred to and are not intended to imply that the objects so described must be in a given sequence, either temporally, spatially, in ranking, or any other manner.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some demonstrative embodiments, the circuitry may be implemented in, or functions associated with the circuitry may be implemented by one or more software or firmware modules. In some demonstrative embodiments, the circuitry may include logic, at least partially operable in hardware.

The term "logic" may refer, for example, to computing logic embedded in the circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in and/or implemented as part of various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read-only memory, programmable memory, magnetic memory, flash memory, persistent memory, and the like. Logic may be executed by one or more processors using memory, e.g., registers, stuck, buffers, and/or the like, coupled to one or more processors, e.g., as necessary to execute the logic.

The term "module," as used hereinbelow, is an object file that contains code to extend the running kernel environment.

As used herein, the term "software engine" as used hereinbelow is an object file that contains code to extend the running kernel environment.

The term "digital wallet," as used hereinbelow, is both a software and information component. Digital wallets may be stored on a client-side. The digital wallets may use a Near Field Communication (NFC), e.g., of smartphones, to transfer payments by touching the smartphone to a payment terminal at a store.

The term "EMV," as used hereinbelow, is a payment method based upon a technical standard for smart payment cards and for payment terminals and automated teller machines. EMV originally stood for "EuroPay, Mastercard, and Visa," the three companies which created the global payment standard.

The term "EMV terminal," as used hereinbelow, is a payment terminal also known as a Point of Sale (POS) terminal, credit card terminal, etc. The EMV terminal is a device that interfaces with payment cards, e.g., EuroPay, MasterCard, and Visa, to make electronic funds transfers. The terminal typically consists of a secure keypad for entering a PIN, a screen, a means of capturing information from payments cards, and a network connection to access the payment network for authorization.

In some demonstrative embodiments, the payment terminal may allow a merchant to capture required credit and/or debit card information and transmit this data to the merchant services provider and/or bank for authorization and transfer funds to the merchant. The terminal may allow the merchant and/or their client to swipe, insert and/or hold a card near the device to capture the information.

The term "Card(s)," as used hereinbelow, may include, for example, the prepaid card created and issued by an issuer, credit cards, debit cards, or the like.

The term "Customer Credit Card Terminal," as used hereinbelow, may include a transaction terminal, EMV, and/or non-EMV, which may be used by the Customer platform to generate payment card data for each End-User credit card associated with the customer mobile application. For example, such terminals may reside with a payments gateway company or processor company The term "customer mobile application," as used hereinbelow, may include at least one application which is installed on the customer's computing device, for example, the loyalty club application, e-Wallet application, or the like. The customer mobile application may include the digital wallet SDK and may interact with the digital wallet platform and the customer platform. The customer mobile application may be configured to run on a computing device operating system, such as, for example, iOS and Android or React.

The term "Payment Card Data," as used hereinbelow, may include a unique placeholder called a payment card data and/or payment data and/or payment element, which is configured to include encrypted information of a payment ability of the user, for example, a credit card, a debit card, bank money transfer information, or the like. For example, the payment card data may be embedded into a payment card token. The payment card data may include the payment card number. For example, if the payment card number is 1234 5678 8765 4321, the payment card data identification may be, for example, E67TL8GC27X. In some demonstrative embodiment, the payment card data may be configured to access, retrieve, and maintain, for example, a customer's credit card information to ensure a higher level of security for both the customer and the business. The payment card data may be saved on the customer platform and/or on the customer's single-use mobile application. In some demonstrative embodiments, the payment card data may include a single-use payment card data.

The term a Uniform Resource Locator (URL), as used hereinbelow, may be colloquially termed a web address, is a reference to a web resource that specifies its location on a computer network and a mechanism for retrieving it. A URL is a specific type of Uniform Resource Identifier (URI), although many people use the two terms interchangeably. URLs occur most commonly to reference web pages (HTTP) but are also used for file transfer (FTP), email (mailto), database access (JDBC), and many other applications. For example, web browsers may display the URL of a web page above the page in an address bar. A URL may have the form http://www.example.com/index.html, which indicates a protocol (HTTP), a hostname (www.example.com), and a file name (index.html).

The term "Payment Card Data Service Provider (PCDSP)," as used hereinbelow, is an entity certified by, for example, MasterCard, Visa, or any other issuers, which are allowed to generate EMV data. The PCDSP may include an entity within the payments ecosystem that is configured to provide registered payment card data requestors. For example, the merchants holding the card credentials—with 'surrogate' Primary Account Number (PAN) values, otherwise known as payment card data. For example, the service may be provided by gateway services if desired.

Reference is made first to FIG. 1, which is an illustration of a block diagram of a system 100 for purchasing goods and services using a web browser 130, according to some demonstrative embodiments.

In some demonstrative embodiments, system 100 may include a computing device 110. For example, computing device 110 may include a smartphone, a tablet, a mobile computer, an electronic wallet, a dongle, a desktop computer, a computing device, or the like.

In some demonstrative embodiments, computing device 110 may include processing circuitry 120. For example, processing circuitry 120 may include one or more processors having one or more cores, a digital signal processor, a graphic processor, a communication processor, one or more memories, and the like.

In some demonstrative embodiments, computing device 110 may include a near field communication (NFC) radio 125. For example, NFC radio 125 may be configured to transfer payment card data by a payment program 134 to a payment terminal 140. For example, the transfer of the payment card data may be done by attaching the computing device 110 to the payment terminal 140 at a point of sale (POS) (not shown), e.g., a store, a restaurant, a service provider, an office, etc.

In some demonstrative embodiments, the payment program 134 may be embedded in the web page 130 and include a temporary digital wallet software. For example, the temporary digital wallet software may load with the payment card data and may use the processing circuitry 120 to control the NFC radio 125. The processing circuitry may operate the NFC radio 125 to transfer the payment card data and payment to the payment terminal 140.

In some demonstrative embodiments, system 100 may include a payment server 160. The payment server 160 may include a downloadable payment program 162, a URL generator 164, and a payment card data generator module 166.

In some demonstrative embodiments, the payment card data generator 166 may be operably connected to a payment cards issuer server 170. The payment cards issuer server 170 may issue one or more payment cards 172, e.g., credit cards, debit cards, loadable cards, loyalty club cards, gift cards, and the like.

The payment cards issuer server 170 may receive the payment card data from the payment terminal 140 and may transfer the payment to a merchant and/or service provider and/or the like.

In some demonstrative embodiments, the payment card data generator module 166 may generate payment card data 134 based on the payment card, e.g., credit card 172, at the issuer server 170. For example, the payment card data may include a predetermined amount of payment to be used by the user and/or credit.

For example, the predetermined amount of payment may be selected from a national currency, a cryptographic currency, loyalty club points and a money-worth coupon.

In some demonstrative embodiments, the URL generator module 164 may be configured to generate a URL 150. The URL 150 may include a link to a website that embeds the payment program 162 and/or payment card data, e.g., payment card data 134.

In some demonstrative embodiments, computing device 110 may receive the URL 150 as a text message, e.g., Short Message Service (SMS), and/or any other format used by one or more texting applications. For example, by clicking on the URL, the web browser 132 may download a web page that enables activation of the payment program 134 and the payment data 134 at the mobile device 110.

Advantageously, using a temporary digital wallet, including temporary payment card data, may increase the security of the user from being hacked and/or from stealing his payment card data. Furthermore, this is a new, easy and secure way to transfer money to the user. The user may use the payment card data on any device by clicking on the URL provided in a text message.

In some demonstrative embodiments, the payment program may stay installed until the payment session is in progress and may be deleted with the payment card data when the payment session ends. Advantageously, this way of operation may apply the highest security level to the user from being hacked, and the payment card data does not remain stored at the computing device.

In some demonstrative embodiments, system 100 for managing payments may be configured to use the web browser 130 to pay for goods and services. System 100 may include the computing device 110, e.g., a mobile device. The computing device 110 may be configured to activate an URL 150. The URL 150 may be linked to a website at a server the website may include a payment program 162 and/or payment card data 134. The payment program 162 may be configured to perform payment based on payment card data 134. For example, payment data 134 may be loaded into payment card data 168. Computing device 110 may perform the payment by the payment program 132.

For example, the payment card data may include at least one of the bank account details, account holder details, an available amount of money, and/or any other data.

In some demonstrative embodiments, the payment program 132 may be configured to transfer the payment data 134 through NFC radio 125 to the payment terminal 140. The payment program 132 may be deleted after performing the payment. For example, deletion of the payment program 132 may be done by closing the web page and/or by closing the program and/or by closing the web browser 130.

In some demonstrative embodiments, payment terminal 140 may include EuroPay, MasterCard, Visa (EMV) terminal, and\or any other terminal.

In some demonstrative embodiments, the activation of the URL 150 may cause the web browser 130 to open a web page and activate the payment program 132, as well. For example, activation of the URL 150 may trigger the web browser 130 to download and install the payment program 132. In some other demonstrative embodiments, the payment program 132 may be embedded on the web page, for example, as an instance. The web page may be programmed with ActiveX and/or JavaScript and/or HTML language and/or by any other programing language.

In some demonstrative embodiments, the payment program 132 may be configured to enable the NFC radio 125 to transfer the payment card data 134 to the EMV terminal 140 and/or to any other terminal. For example, payment program 132 may include a digital wallet program and/or any other type of payment program. It should be understood that the digital wallet program may be a temporary digital wallet program that may be deleted when closing the web page and/or the web browser 130.

In some demonstrative embodiments, the web page may include a graphical representation of the URL 150 and one or more instructions on how to activate the URL and/or how to perform purchases using the payment program 132.

In some demonstrative embodiments, server 160 may include a server for managing payments, e.g., a payment server. Server 160 may be configured to generate the URL 150, which may be linked to the resource, e.g., a website, at server 160. For example, the website may include an embedded payment program 162 that may be configured to perform payment based on the payment card data 168. The payment program 162 may be configured to perform payment based on the payment data uploaded to the payment card data 168. For example, server 160 may send the URL 150 to the computing device 110.

In some demonstrative embodiments, the payment data may include a predetermined amount of payment. For example, the predetermined amount of payment may be selected from a national currency, a cryptographic currency, loyalty club points and money worth coupon or the like.

In some demonstrative embodiments, server 160 may be configured to send the URL to the mobile device 110 in a text message 150.

Figure 2:
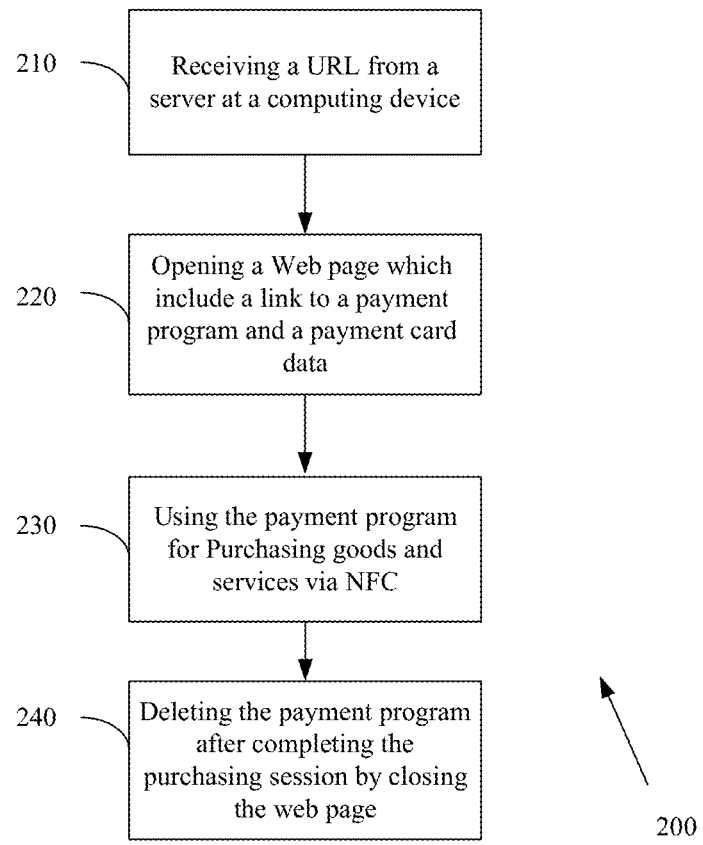
FIG. 2 illustrates a flow chart of a method for purchasing goods and services with a one-time use digital wallet application uploaded by a web page, according to some demonstrative embodiments.

Reference is now made to FIG. 2, which is a schematic illustration of a flow chart of a method 200 for purchasing goods and services with a one-time use digital wallet application uploaded by a web page, according to some demonstrative embodiments.

In some demonstrative embodiments, method 200 may be configured to perform payments by using a web browser for paying for goods and services. Method 200 may be operated by a payment program, e.g., a digital wallet, installed on a mobile device, e.g., computing device 110 (FIG. 1).

In some demonstrative embodiments, method 200 is configured to receive a URL, e.g., URL 150 (FIG. 1), from a server, e.g., payment server 160 (FIG. 1), at the computing device 110 (text box 210). A user may activate the URL 150, which may be linked to a resource at server 160. For example, the resource may include the payment card data and the payment program. For example, the payment program, e.g., a digital wallet, may be configured to perform payment based on payment data uploaded to the payment card data.

In some demonstrative embodiments, activating the URL may cause the opening of a web page at the web browser. The web page may include the payment program, e.g., payment program 162 (FIG. 1), and the payment card data, e.g., payment card data 134 (text box 220).

In some demonstrative embodiments, the payment program may perform payment by transferring the payment card data through an NFC radio, e.g., NFC radio 125 (FIG. 1), to a payment terminal, e.g., payment terminal 140 (FIG. 1) (text box 230).

In other demonstrative embodiments, the transfer of the payment data to the payment terminal and/or directly to the merchant/seller account may be done with any type of data transfer technology.

In some demonstrative embodiments, after transferring the payment to the merchant/seller account and/or completing the purchasing session, the payment program may be deleted from the computing device when closing the web page and/or the web browser (text box 240).

Figure 3:
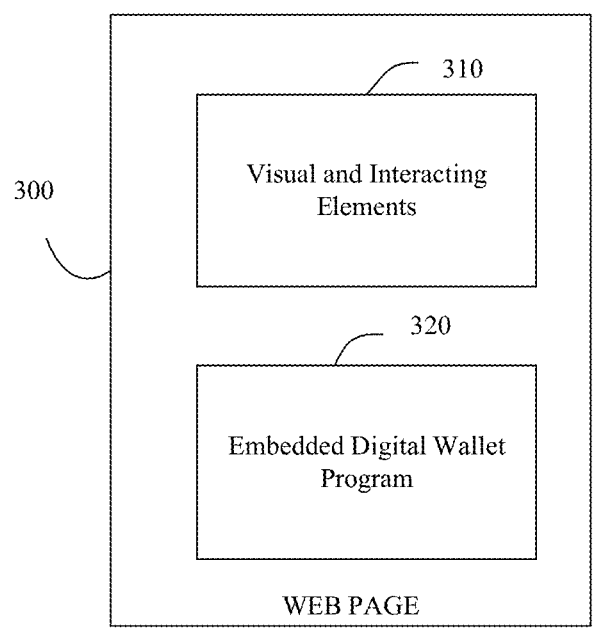
FIG. 3 illustrates a block diagram of a web page, according to some demonstrative embodiments.

Reference is now made to FIG. 3, which illustrates a block diagram of a web page 300, according to some demonstrative embodiments. For example, web page 300 may include one or more visual and/or interacting and/or information elements 310, such as for example, images, video, text, forms, a chat application, and any other information elements.

In some demonstrative embodiments, web page 300 may include a payment program 320. For example, the payment program 320 may include a digital wallet application with payment card data. For example, the payment card data may be loaded with a predetermined amount of payment and/or credit. The payment card data may be stored in the digital wallet program and/or application.

In other demonstrative embodiments, the payment card data may be linked to the digital wallet program and/or application.

Figure 4:
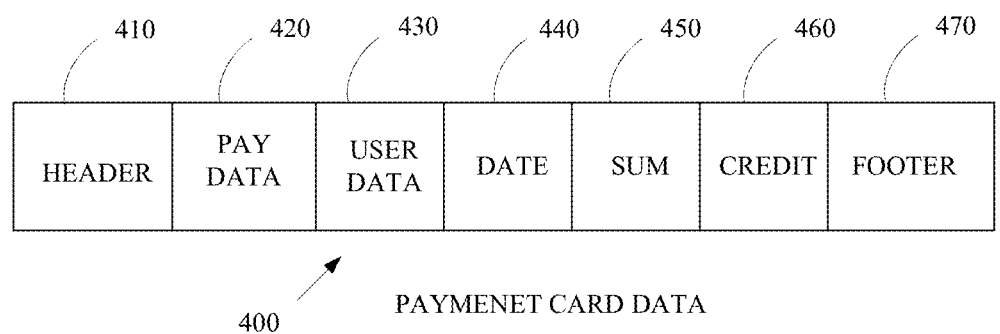
FIG. 4 illustrates a frame of paying card data, according to some demonstrative embodiments.

Reference is now made to FIG. 4, which illustrates a frame of a paying card data 400, according to some demonstrative embodiments.

In some demonstrative embodiments, payment card data 400 may include a header field 410, a payment card data field 420, a user data field 430, a date of expiration field 440, a sum of money field 450, a credit field 460, and a footer field.

For example, the payment card data field 420 may include data of a user's credit card, for example, credit card number, expiration date, a bank account number of a user, and a CCV number. The user data field 430 may include, for example, a user first name, a user family name, a user identification number (ID), and the like. The date field 440 may include, for example, a date and/or an hour of expiration of the payment card data 400. The sum field 450 may include, for example, the amount of money that the user can spend. The credit field 460 may include, for example, the credit limit of the payment card of the user, and the footer field 470 may include, for example, an authentication code of payment card data 400. It should be understood that in other embodiments, the payment card data may include different fields.

In some demonstrative embodiments, the payment card data 400 may be encrypted when it's stored at the payment program 132 (FIG. 1) and may be decrypted when it's transferred to the payment terminal 140 (FIG. 1.)

Figure 5:
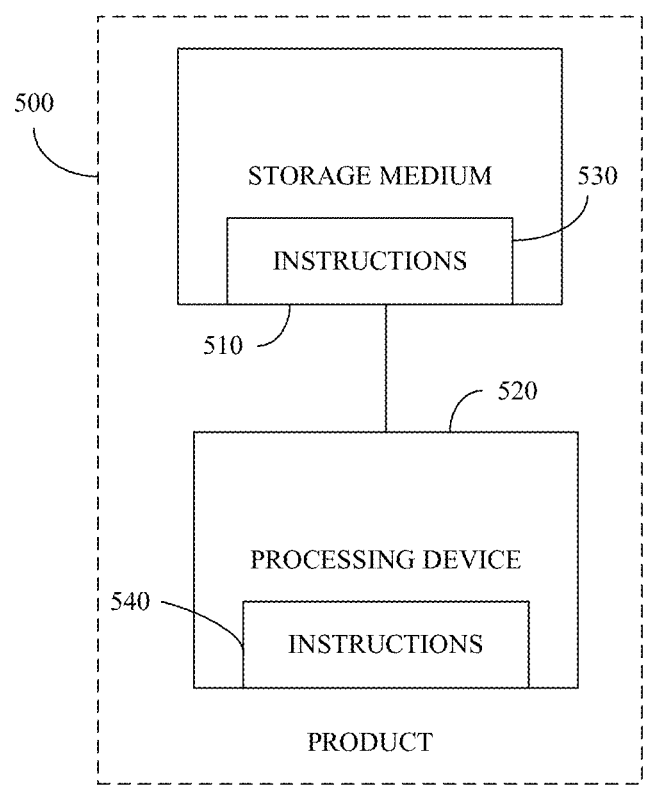
FIG. 5 illustrates a product of manufacture, according to some demonstrative embodiments.

Reference is now made to FIG. 5, which is a schematic illustration of a product of manufacture 500, according to some demonstrative embodiments. Product 500 may include one or more tangible computer-readable non-transitory storage media 510, which may include computer-executable instructions 530, implemented by processing device 520, operable to, when executed by at least one computer processor, enable at least one processing circuitry 120 (FIG. 1) to implement one or more program instructions for purchasing goods and services with a payment program that is downloaded and installed by clicking on a link of a web page. At least one processing circuitry 120 (FIG. 1) may be configured to implement one or more program instructions and/or to perform, trigger and/or implement one or more operations, communications and/or functionalities as described above with reference to FIGS. 1, 2, 3, 4 and 6. The phrase "non-transitory machine-readable medium" is directed to include all computer-readable media, with the sole exception being a transitory propagating signal.

In some demonstrative embodiments, product 500 and/or machine-readable storage medium 510 may include one or more types of computer-readable storage media capable of storing data, including volatile memory, non-volatile memory, removable or non-removable memory, erasable or non-erasable memory, writeable or re-writeable memory, and the like. For example, machine-readable storage medium 310 may include any type of memory, such as, for example, RAM, DRAM, ROM, programmable ROM (PROM), erasable programmable ROM (EPROM), electrically erasable programmable ROM (EEPROM), Flash memory, a hard disk drive (HDD), a solid-state disk drive (SDD), fusion drive, and the like. The computer-readable storage media may include any suitable media involved with downloading or transferring a computer program from a remote computer to a requesting computer carried by data signals embodied in a carrier wave or other propagation medium through a communication link, e.g., a modem, radio, or network connection.

In some demonstrative embodiments, processing device 520 may include logic. The logic may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, processing device 520 may include or may be implemented as software, firmware, a software module, an application, a program, a subroutine, instructions, an instruction set, computing code, words, values, symbols, and the like. Instructions 540 may include any suitable types of code, such as source code, compiled code, interpreted code, executable code, static code, dynamic code, and the like. Instructions may be implemented according to a predefined computer language, manner, or syntax for instructing a processor to perform a specific function. The instructions may be implemented using any suitable high-level, low-level, object-oriented, visual, compiled and/or interpreted programming languages, such as C, C++, C#, Java, Python, BASIC, Mat lab, assembly language, machine code, and the like.

Figure 6:
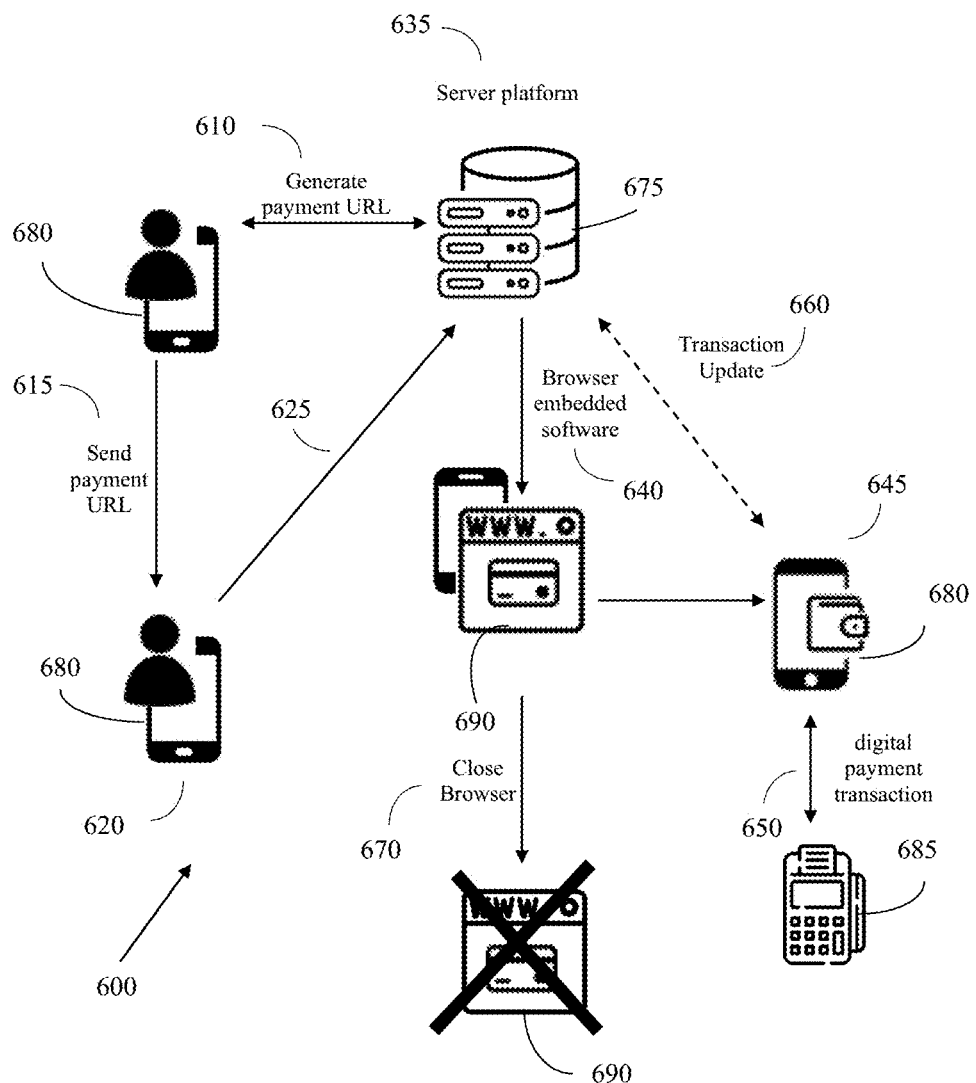
FIG. 6 illustrates a block diagram of a system for purchasing goods and services using a web browser and a flow of a method for purchasing goods and services according to some demonstrative embodiments.

Turning to FIG. 6, which illustrates a block diagram of a system 600 for purchasing goods and services using a web browser 690 and a flow of a method for purchasing goods and services according to some demonstrative embodiments.

In some demonstrative embodiments, system 600 may include a server 675, a mobile device 680, and a payment terminal 685.

For example, the mobile device 680 may include the computing device 110 (FIG. 1), a cellphone, a tablet, a laptop computer, and the like.

In some demonstrative embodiments, server 675 may generate a payment URL (line 610). Mobile device 680 may receive from server 675 a text message (not shown) (line 615), with the URL 150 (FIG. 1), which may be linked to a website at server 675. Mobile device 680 may activate the URL 150 (FIG. 1) (line 625), wherein the activation of the URL 150 may open web page 690 (line 640).

For example, web page 690 may include an embedded payment program 132 (FIG. 1), which may be loaded with a predetermined amount of payment and may install the embedded payment program in the mobile device (line 640). Mobile device 680 may be configured to transfer the payment card data 168 (FIG. 1) and the predetermined amount of payment through NFC radio 125 (FIG. 1) of the mobile device 680 to payment terminal 685 by the embedded payment program (line 650), and delete the embedded payment program and the payment card data after performing the payment by closing the web page at the end of the transaction (line 670).

For example, the predetermined amount of payment is selected from a national currency, a cryptographic currency, loyalty club points and a money-worth coupon and the like.

In some demonstrative embodiments, the mobile device 680 may be configured to send purchase status information to server 675 (dotted line 660).

It is to be understood that the system and/or the method for performing payments by using a web browser for paying for goods and services is described hereinabove by way of example only. Other embodiments may be implemented based on the detailed description and the claims that followed.

It is to be understood that like numerals in the drawings represent like elements through the several figures and that not all components and/or steps described and illustrated with reference to the figures are required for all embodiments or arrangements.

It should also be understood that the embodiments, implementations, and/or arrangements of the systems and methods disclosed herein can be incorporated as a software algorithm, application, program, module, or code residing in hardware, firmware, and/or on a computer useable medium (including software modules and browser plug-ins) that can be executed in a processor of a computer system or a computing device to configure the processor and/or other elements to perform the functions and/or operations described herein.

It should be appreciated that according to at least one embodiment, one or more computer programs, modules, and/or applications that, when executed, perform methods of the present invention need not reside on a single computer or processor but can be distributed in a modular fashion amongst a number of different computers or processors to implement various aspects of the systems and methods disclosed herein.

Thus, illustrative embodiments and arrangements of the present systems and methods provide a computer-implemented method, computer system, and computer program product for processing code(s). The flowchart and block diagrams in the figures illustrate the architecture, functionality, and operation of possible implementations of systems, methods, and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of order noted in the figures. For example, two blocks shown in succession may be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by particular purpose hardware-based systems that perform the specified functions or acts, or combinations of specialized purpose hardware and computer instructions.

The terminology used herein is to describe particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described and without departing from the true spirit and scope of the present invention, which is set forth in the following claims.

What is claimed is:

1. A system for performing payments by using a web browser for paying for goods and services, comprising a mobile device comprising a processing circuitry and a server for managing payments, wherein the server is configured to:
generate a uniform resource locator (URL), which is linked to a web page at the server, wherein the web page comprises an embedded payment program that is configured to perform payment based on a payment card data; and
send the URL to the mobile device in a text message;
wherein the mobile device is configured to:
receive from the server the text message comprising the URL;
activate the URL, wherein the activation of the URL opens the web page comprising the embedded payment program which is loaded with a predetermined amount of payment and installs the embedded payment program in the mobile device and wherein the embedded payment program comprising a temporary digital wallet software configured to use the processing circuitry to control a near field communication (NFC) radio of the mobile device;
transfer the payment card data and the predetermined amount of payment through the NFC radio to a payment terminal by the embedded payment program; and
delete the embedded payment program and the payment card data from the mobile device after performing the payment by closing the web page at the end of the transaction.

2. The system of claim 1, wherein the payment terminal comprises EuroPay, MasterCard, Visa (EMV) terminal.

3. The system of claim 1, wherein the payment card data comply with the EMV standard.

4. The system of claim 1, wherein the web page comprises a graphical representation of the embedded payment program and one or more information elements.

5. The system of claim 1, wherein the embedded payment program is configured to control the NFC radio.

6. The system of claim 1, wherein the payment card data comprises at least one of a bank account details, an account holder date of expiration of the payment card data, an available sum of money for payment.

7. The system of claim 1, wherein the mobile device is configured to send a purchase status information to the server.

8. The system of claim 1, wherein the predetermined amount of payment is selected from a national currency, a cryptographic currency, loyalty club points and money worth coupon.

9. A method for performing payments by using a web browser for paying for goods and services operating in a mobile device, comprising:
generating, by a server for managing payment, a uniform resource locator (URL), which is linked to a web page at the server, wherein the web page comprises an embedded payment program that is configured to perform payment based on a payment card data; and
sending, by the server, the URL to a mobile device comprising a processing circuitry in a text message;
receiving, by the mobile device from the server the text message comprising the URL, which is linked to a web page at the server;
activating the URL, wherein the activation of the URL opens a web page comprising the embedded payment program which is loaded with a predetermined amount of payment and installs the embedded payment program in the mobile device and wherein the embedded payment program comprising a temporary digital wallet software configured to use the processing circuitry to control a near field communication (NFC) radio of the mobile device;
performing a payment by the embedded payment program in the mobile device, which is configured to transfer the payment card data through the NFC radio of the mobile device to a payment terminal; and
after performing the payment, delete the embedded payment program from the mobile device by closing the web page at the end of the transaction.

10. The method of claim 9, wherein the payment terminal comprises a EuroPay, MasterCard, Visa (EMV) terminal.

11. The method of claim 9, wherein the payment card data comply with an EMV standard.

12. The method of claim 9, wherein the web page comprises a graphical representation of the embedded payment program and information related to a payment using the web page.

13. The method of claim 9, wherein the payment card data comprises at least one of a bank account details, an account holder details, a date of expiration of the payment card data, and an available sum of money for payment.

14. The method of claim 9, wherein the mobile device is configured to send purchase status information to the server.

15. The method of claim 9, wherein the predetermined amount of payment is selected from a national currency, a cryptographic currency, loyalty club points, and money worth coupon.

16. A server for performing payments, wherein the server is configured to:

generate a text message comprising a uniform resource locator (URL), which is linked to a web page at the server, wherein the web page comprises an embedded payment program loaded with a predetermined amount of payment and payment card data to be installed in a mobile device;

send the URL to a mobile device to be activated; and perform payment by the embedded payment program, which is configured to transfer payment card data through a near field communication (NFC) radio to a payment terminal;

wherein the embedded program and the payment card data are deleted from the mobile device after performing the payment by closing the web page at the end of the transaction.

17. The server of claim 16, wherein the payment terminal comprises an EuroPay, MasterCard, Visa (EMV) terminal.

18. The server of claim 16, wherein the payment card data comply with an EMV standard.

19. The server of claim 16, wherein the embedded software program comprises a digital wallet program loaded with the predetermined amount of payment.

20. The server of claim 16, wherein the web page comprises a graphical representation of a link for downloading the software program and information related to the user payment card data.

21. The server of claim 16, wherein the payment card data comprises at least one of bank account details, account holder details, date of expiration of the payment card data, an available sum of money for payment.

22. The server of claim 16 is configured to receive a purchase status information from the mobile device is configured to send to the server.

23. The server of claim 16, wherein the predetermined amount of payment is selected from a national currency, a cryptographic currency, loyalty club points and money worth coupon.

* * * * *